US009450225B2

(12) United States Patent
Nakayama

(10) Patent No.: US 9,450,225 B2
(45) Date of Patent: Sep. 20, 2016

(54) COVER FOR BATTERY WIRING MODULE, AND BATTERY WIRING MODULE

(75) Inventor: Osamu Nakayama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 359 days.

(21) Appl. No.: 14/232,065

(22) PCT Filed: Aug. 6, 2012

(86) PCT No.: PCT/JP2012/069959
§ 371 (c)(1),
(2), (4) Date: Jan. 10, 2014

(87) PCT Pub. No.: WO2013/021964
PCT Pub. Date: Feb. 14, 2013

(65) Prior Publication Data
US 2014/0154551 A1   Jun. 5, 2014

(30) Foreign Application Priority Data
Aug. 8, 2011  (JP) ................. 2011-172855

(51) Int. Cl.
H01M 2/20   (2006.01)
B60L 11/18  (2006.01)
H01M 2/10   (2006.01)

(52) U.S. Cl.
CPC .......... *H01M 2/206* (2013.01); *B60L 11/1879* (2013.01); *H01M 2/1077* (2013.01); *Y02T 10/705* (2013.01); *Y02T 10/7005* (2013.01)

(58) Field of Classification Search
CPC .............. H01M 2/206; H01M 2/1077; B60L 11/1879; Y02T 10/705; Y02T 10/7005
See application file for complete search history.

(56) References Cited

U.S. PATENT DOCUMENTS 5,080,985 A   1/1992  Wiacek et al.
5,804,770 A   9/1998  Tanaka
(Continued)

FOREIGN PATENT DOCUMENTS

DE   100 53 541 A1   6/2001
JP   A-09-106802     4/1997
(Continued)

OTHER PUBLICATIONS

International Search Report issued in Application No. PCT/JP2012/069959; Dated Oct. 30, 2012.
(Continued)

*Primary Examiner* — Patrick Ryan
*Assistant Examiner* — Aaron Greso
(74) *Attorney, Agent, or Firm* — Oliff PLC

(57) ABSTRACT

A cover is provided, and a battery wiring module is provided with the cover. The cover can cover a resin protector of the battery wiring module, and the battery wiring module includes: a bus bar that electrically connects positive and negative electrode terminals of a cell group formed by arranging in a row a plurality of cells having the electrode terminals; and the resin protector that holds the bus bar. The resin protector can be deformed or moved in accordance with a variation of a pitch between the electrode terminals. The cover for the battery wiring module includes a dislocation compensating portion that compensates a dislocation of the resin protector resulting from deformation or movement thereof.

10 Claims, 11 Drawing Sheets

(56) References Cited

U.S. PATENT DOCUMENTS

| | | | |
|---|---|---|---|
| 6,261,719 B1 | 7/2001 | Ikeda et al. | |
| 2011/0064987 A1* | 3/2011 | Ogasawara | H01M 2/206 |
| | | | 429/121 |
| 2012/0028090 A1 | 2/2012 | Kyung-Su et al. | |

FOREIGN PATENT DOCUMENTS

| | | | | |
|---|---|---|---|---|
| JP | A-2000-149909 | | 5/2000 | |
| JP | A-2002-164034 | | 6/2002 | |
| JP | A-2008-053072 | | 3/2008 | |
| JP | A-2009-277420 | | 11/2009 | |
| JP | 2011-018478 | * | 1/2011 | ............. H01M 2/20 |
| JP | A-2011-008955 | | 1/2011 | |
| KR | 2011 0029061 A | | 3/2011 | |

OTHER PUBLICATIONS

Dec. 16, 2014 Search Report issued in European Application No. 12821611.6.

* cited by examiner

COVER FOR BATTERY WIRING MODULE, AND BATTERY WIRING MODULE

This application is the national phase of PCT International Application No. PCT/P2012/069959 that has an International filing date of Aug. 6, 2012 and designated the United States of America and claims priority to Japanese Patent App. No. JP 2011-172855 that was filed on Aug. 8, 2011. The disclosure of the prior applications is hereby incorporated by reference herein in their entirety.

BACKGROUND

In battery modules for electric automobiles and hybrid automobiles, a plurality of cells having positive and negative electrode terminals are arranged in a row. In such a battery module, a positive electrode terminal (positive terminal) and a negative electrode terminal (negative terminal) are connected by a connection member such as a bus bar, so that the plurality of cells is electrically connected.

In order to electrically connect a plurality of cells, for example, a battery wiring module as described in JP 2011-8955A is used.

SUMMARY

Technical Problem

According to the battery wiring module described in JP 2011-8955A, a plurality of connection units having bus bar holding portions are coupled, and a bus bar is accommodated in each bus bar holding portion of the connection units, after which the connection units are arranged on terminal formation faces on which electrode terminals of cells are formed, so that the bus bars and the electrode terminals are connected.

A production tolerance is set for each cell forming a cell group to which the battery wiring module is attached, and an assembly tolerance is set between adjacent cells. Accordingly, the pitch interval between adjacent electrode terminals may vary within the range of the production tolerance and the assembly tolerance. Furthermore, the pitch between the electrode terminals may vary also due to deformation such as swelling of the cells.

If the pitch between the electrode terminals varies, it may not be possible to attach the bus bars to the electrode terminals. Thus, research has been conducted on a battery wiring module including a tolerance absorbing portion that absorbs a variation of the pitch.

After being attached to the cell group, the battery wiring module is covered by a resin cover, for example, in order to insulate the bus bars, the electrode terminals, and the like, from the outside. However, since the battery wiring module including the tolerance absorbing portion may be deformed by absorbing a variation of the pitch, the attached cover may come off.

It is an object thereof to provide a cover that can be reliably attached to a battery wiring module, and a battery wiring module provided with the cover.

Solution to Problem

In order to solve the above-described problem, a cover for a battery wiring module is presented, the battery wiring module including: a bus bar that electrically connects positive and negative electrode terminals of a cell group formed by arranging in a row a plurality of cells having the electrode terminals; and a resin protector that holds the bus bar; the cover being capable of covering the resin protector, wherein the resin protector can be deformed or moved in accordance with a variation of a pitch between the electrode terminals, and the cover includes a dislocation compensating portion that compensates a dislocation of the resin protector resulting from deformation or movement thereof.

Furthermore, a battery wiring module is presented, including: a bus bar that electrically connects positive and negative electrode terminals of a cell group formed by arranging in a row a plurality of cells having the electrode terminals; a resin protector that holds the bus bar; and a cover that covers the resin protector; wherein the resin protector can be deformed or moved in accordance with a variation of a pitch between the electrode terminals, and the cover includes a dislocation compensating portion that compensates a dislocation of the resin protector resulting from deformation or movement thereof.

A cover for a battery wiring module includes a dislocation compensating portion that compensates a dislocation of a resin protector that is deformed or moved in accordance with a variation of a pitch between the electrode terminals. Thus, even when the resin protector is dislocated by being deformed or moved, due to a variation of the pitch between the electrode terminals, for example, resulting from a production tolerance or an assembly tolerance of the cells forming the cell group, the dislocation of the resin protector can be compensated by the cover. As a result, even when the resin protector is dislocated by absorbing a variation of the pitch between the electrode terminals, the dislocation is compensated by the dislocation compensating portion formed on the cover, and, thus, the cover can be reliably attached to the battery wiring module.

The configuration may be such that the dislocation compensating portion is configured by a plurality of thin-walled portions that have a wall thickness smaller than that of other portions, and a thick-walled portion that is formed between two of the thin-walled portions and that has a wall thickness larger than that of the thin-walled portion.

With this configuration, when the thin-walled portions having a smaller wall thickness are bent, the cover can be extended and compressed, so that the dislocation of the resin protector can be compensated with a simple structure.

The configuration may be such that the resin protector includes an engagement portion, and the cover includes an engageable portion that, while being engaged with the engagement portion, can move in a direction that intersects a direction in which the thin-walled portions and the thick-walled portion are arranged side by side.

The dislocation compensating portion configured by the thin-walled portions and the thick-walled portion can compensate dislocations in a direction in which the thin-walled portions and the thick-walled portion are arranged side by side. Thus, with this configuration, the engageable portion provided on the cover and engaged with the engagement portion provided on the resin protector moves in a direction that intersects a direction in which the thin-walled portions and the thick-walled portion are arranged side by side, so that the dislocation can be compensated in a direction that intersects the direction in which the dislocation compensating portion performs compensation. Furthermore, since the cover is engaged with the resin protector, the cover can be prevented from being coming off.

The cover may include a positioning portion that is positioned with respect to the resin protector.

With this configuration, the operation efficiency when attaching the cover to the resin protector is improved.

Advantageous Effects

It is an object to provide a cover that can be reliably attached to a battery wiring module, and a battery wiring module.

DETAILED DESCRIPTION OF THE EMBODIMENTS

Embodiment 1

Figure 1:
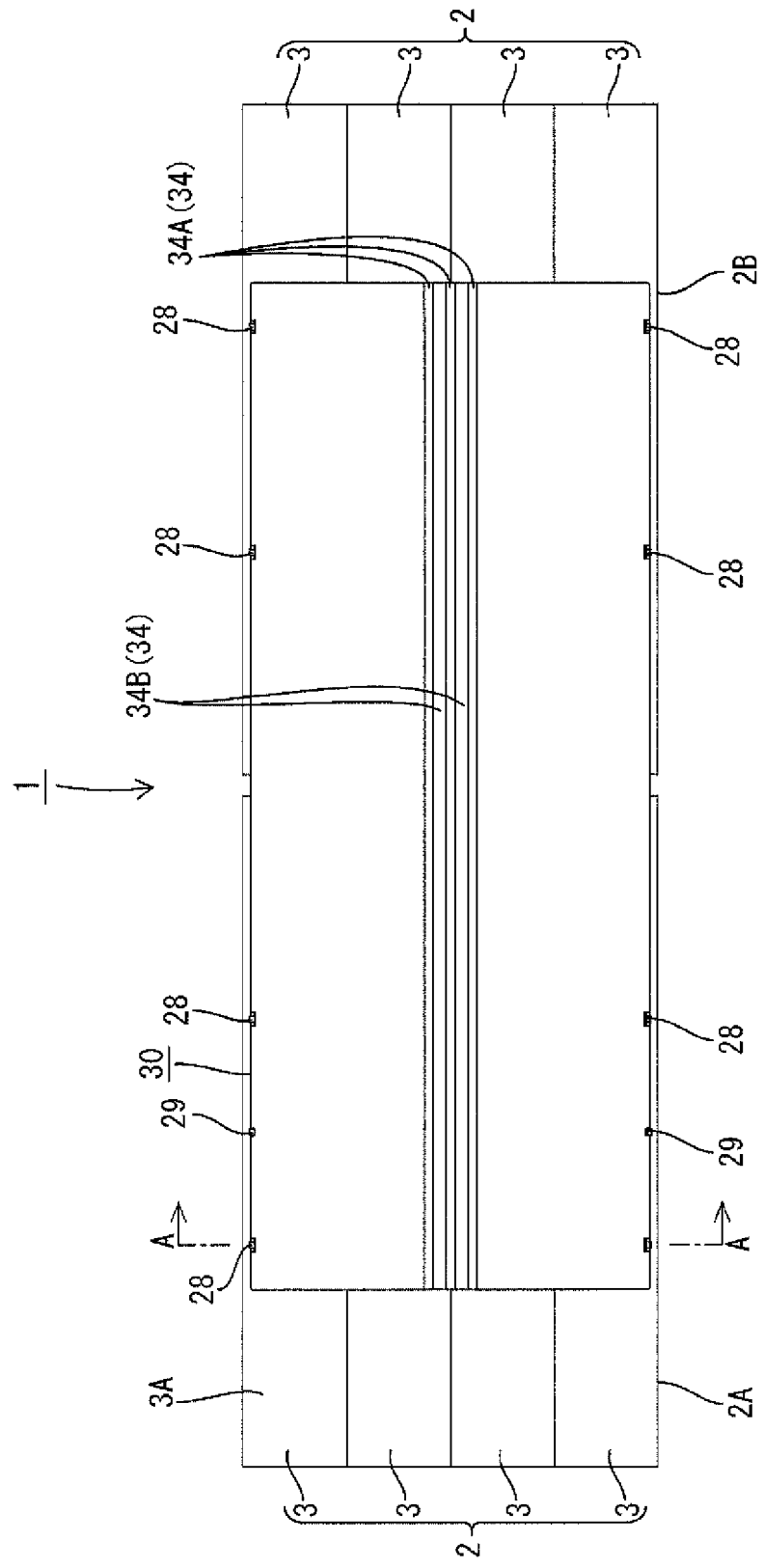
FIG. 1 is a plan view of a battery module of Embodiment 1.
Figure 2:
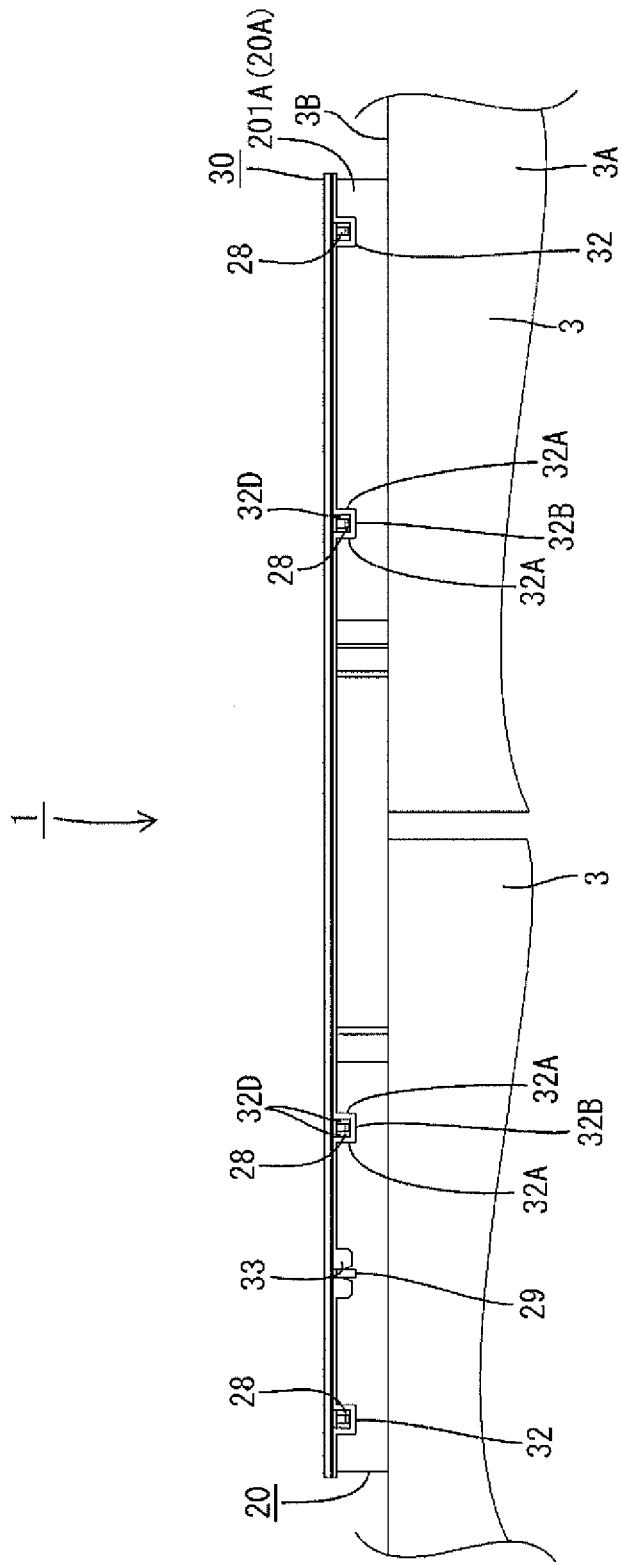
FIG. 2 is a front view of the battery module.
Figure 3:
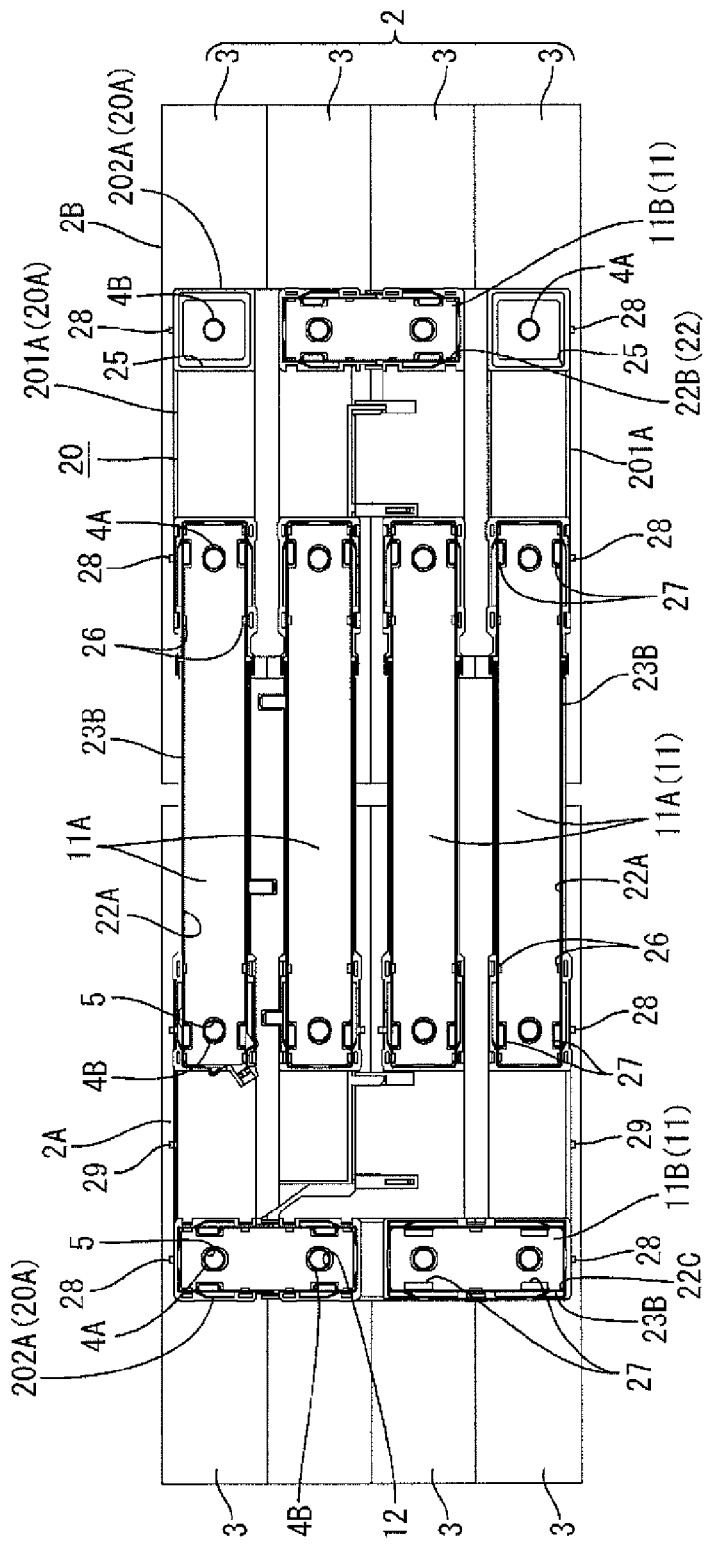
FIG. 3 is a plan view of the battery module from which a cover has been removed.

Hereinafter, Embodiment 1 will be described with reference to FIGS. 1 to 12. FIG. 1 is a plan view of a battery module 1 according to Embodiment 1, and FIG. 2 is a front view of the battery module 1. FIG. 3 is a plan view of the battery module 1 from which a cover 30 has been removed. The lower side in FIG. 1 corresponds to the front side (the front face side) of the battery module 1, and the upper side in FIG. 1 corresponds to the rear side (the rear face side) of the battery module 1.

The battery module 1 of this embodiment is used, for example, as a drive source for automobiles such as electric automobiles and hybrid automobiles. The battery module 1 includes a cell group 2, a battery wiring module 10 that is attached to the cell group 2, and the cover 30 that is attached to the battery wiring module 10.

The cell group 2 is formed by arranging two cell rows 2A and 2B side by side with a gap interposed therebetween, each of the cell rows being formed by arranging four cells 3 in a row. Here, in order to distinguish the two cell rows 2A and 2B from each other, the cell row 2A on the left side in FIG. 1 is referred to as a first cell row 2A, and the cell row 2B on the right side is referred to as a second cell row 2B.

Each cell 3 forming the cell group 2 internally includes an electricity generating element (not shown). The cell 3 includes a main body portion 3A in the shape of a flat rectangular solid internally including the electricity generating element, and two electrode terminals 4 (4A and 4B) that are provided on an upper face 3B (terminal formation face 3B) of the main body portion 3A. One of the electrode terminals denoted by 4A is a positive terminal, and the other electrode terminal denoted by 4B is a negative terminal.

The electrode terminals 4A and 433 vertically project upward from the terminal formation face 3B of the cell 3. Each of the electrode terminals 4A and 4B is configured by a nut in the shape of a square tube, and a round screw hole 5 is formed through the center of the nut.

Each cell 3 forming the two cell rows 2A and 2B is disposed such that the electrode terminals 4A and 4B face upward. The cells 3 in the cell rows 2A and 2B are arranged such that the adjacent electrode terminals 4 of the adjacent cells 3 have opposite polarities. That is to say, the positive and negative electrode terminals 4 are alternately arranged in the front-rear direction of the cell rows 2A and 2B.

Furthermore, the cells 3 in the first cell row 2A and the cells 3 in the second cell row 2B are arranged such that the adjacent electrode terminals 4 of the adjacent cells 3 respectively in the different cell rows 2A and 2B have opposite polarities. Note that the electrode terminals 4 (4A and 4B) of the first cell row 2A and the second cell row 2B are arranged on the same plane. The first cell row 2A and the second cell row 2B are placed on and fixed to a holding plate (not shown) that is disposed on the lower faces of the cells 3 (faces opposite to the terminal formation faces).

Figure 4:
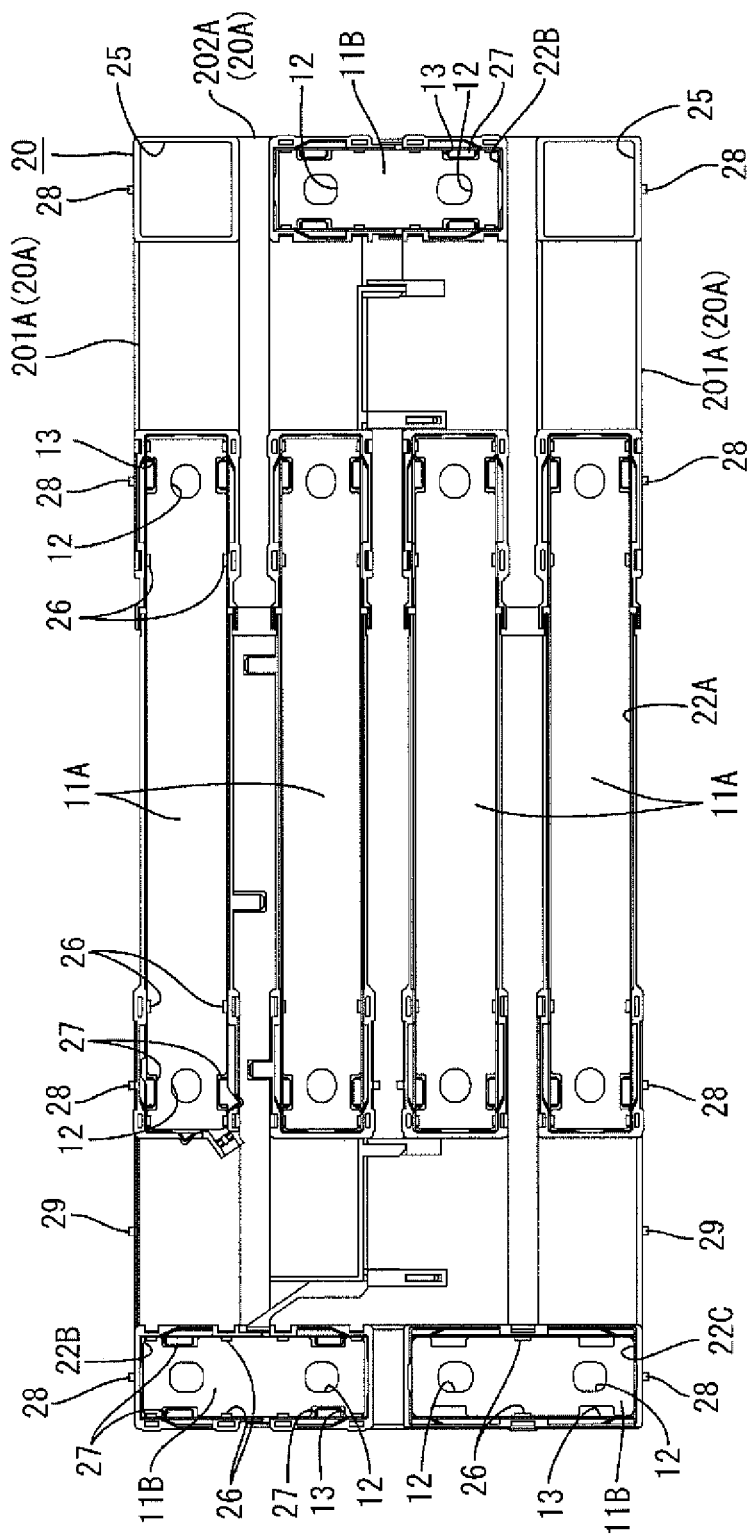
FIG. 4 is a plan view of a battery wiring module.

As shown in FIG. 3, the battery wiring module 10 is placed on the first cell row 2A and the second cell row 2B, and is attached to the cell group 2. That is to say, the plurality of cells 3 forming the cell group 2 are connected to each other by the battery wiring module 10. As shown in FIG. 4, this battery wiring module 10 includes a plurality of bus bars 11 and a resin protector 20 in the shape of a container that accommodates the bus bars 11.

The bus bars 11 are formed by processing a metal material such as copper, copper alloy, stainless steel (SUS), or aluminum, into a predetermined shape. In this embodiment, two types of bus bars having different lengths are used as the bus bars 11. Of these, the longer ones are referred to as first bus bars 11A, and the shorter ones are referred to as second bus bars 11B. Note that the first bus bars 11A and the second bus bars 11B are collectively referred to as bus bars 11.

Figure 5:
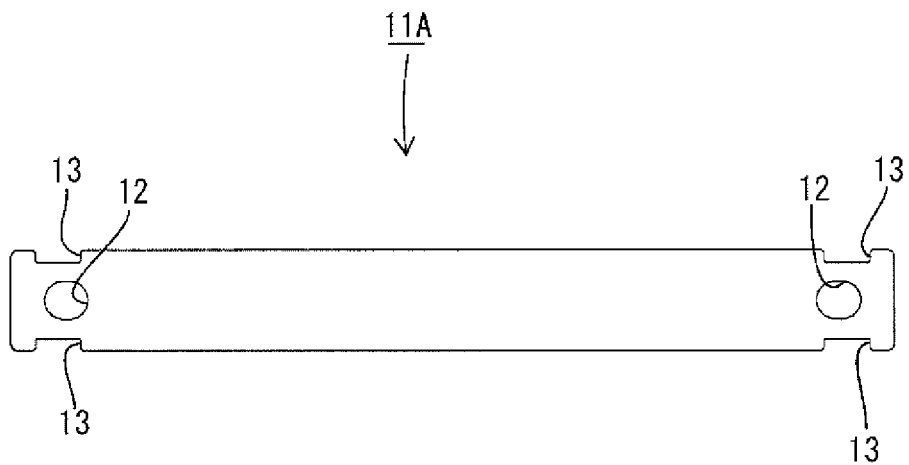
FIG. 5 is a plan view of a first bus bar.

FIG. 5 is a plan view of the first bus bar 11A. As shown in FIG. 5, the first bus bar 11A has an elongated shape with its both ends in the longitudinal direction each provided with a through hole 12 through which a shank portion 6A of a fixing bolt 6 is inserted. Furthermore, each end of the first bus bar 11A is provided with cut-out portions 13 that sandwich the through hole 12 therebetween.

Figure 6:
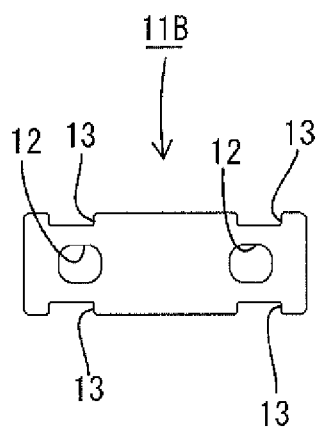
FIG. 6 is a plan view of a second bus bar.

FIG. 6 is a plan view of the second bus bar 11B. As shown in FIG. 6, the second bus bar 11B has the same basic configuration as that of the first bus bar 11A although the length is shorter than that of the first bus bar 11A. Specifically, the second bus bar 11B has a substantially rectangular shape with its both ends in the longitudinal direction each provided with a through hole 12 through which a shank portion 6A of a fixing bolt 6 is inserted, and cut-out portions 13 that sandwich the through hole 12 therebetween.

Each bus bar 11 extends to link the electrode terminals 4A and 4B having opposite polarities so as to electrically connect these electrode terminals, at a plurality of locations on the cell group 2. The cells 3 forming the cell group 2 are connected in series by the bus bars 11. The first bus bar 11A is used to electrically connect the electrode terminals 4A and 4B having opposite polarities in the adjacent cells 3 respectively in the first cell row 2A and the second cell row 2B. Meanwhile, the second bus bar 11B is used to electrically connect the electrode terminals 4A and 4B having opposite polarities in the adjacent cells 3 in the front-rear direction of each of the first cell row 2A and the second cell row 2B. Note that the bus bars 11 are used in a state in which they are held by the resin protector 20 (see FIGS. 3 and 4).

The ends of the bus bars 11 are placed on the electrode terminals 4 and are fixed to the electrode terminals 4. At that time, the position of the through hole 12 at each end of each bus bar 11 is set to the position of the screw hole 5 of the electrode terminal 4. Then, the shank portion 6A of the fixing bolt 6 is inserted into the through hole 12 of the bus bar 11 and the screw hole 5 of the electrode terminal 4, and the fixing bolt 6 is screwed into the screw hole 5 such that the bus bar 11 and the electrode terminal 4 are in close contact with each other.

Note that the through hole 12 provided in the bus bar 11 is in the shape of an elongated hole when viewed from above, and is set to be larger than the screw hole 5 of the electrode terminal 4. Furthermore, the through hole 12 is elongated in the longitudinal direction of the bus bar 11. Since the bus bar 11 includes such an elongated through hole 12, the through hole 12 of the bus bar 11 can be positioned on the screw hole 5 of the electrode terminal 4 such that the fixing bolt 6 can be inserted into these holes even if the position of the electrode terminal 4 is dislocated from the position where it should be. Note that such a dislocation of the electrode terminals 4 is caused by, for example, attachment errors of the electrode terminals 4 in the cells 3, deformation such as swelling of the cells 3, or errors in the arrangement intervals in the first cell row 2A and the second cell row 2B.

Figure 7:
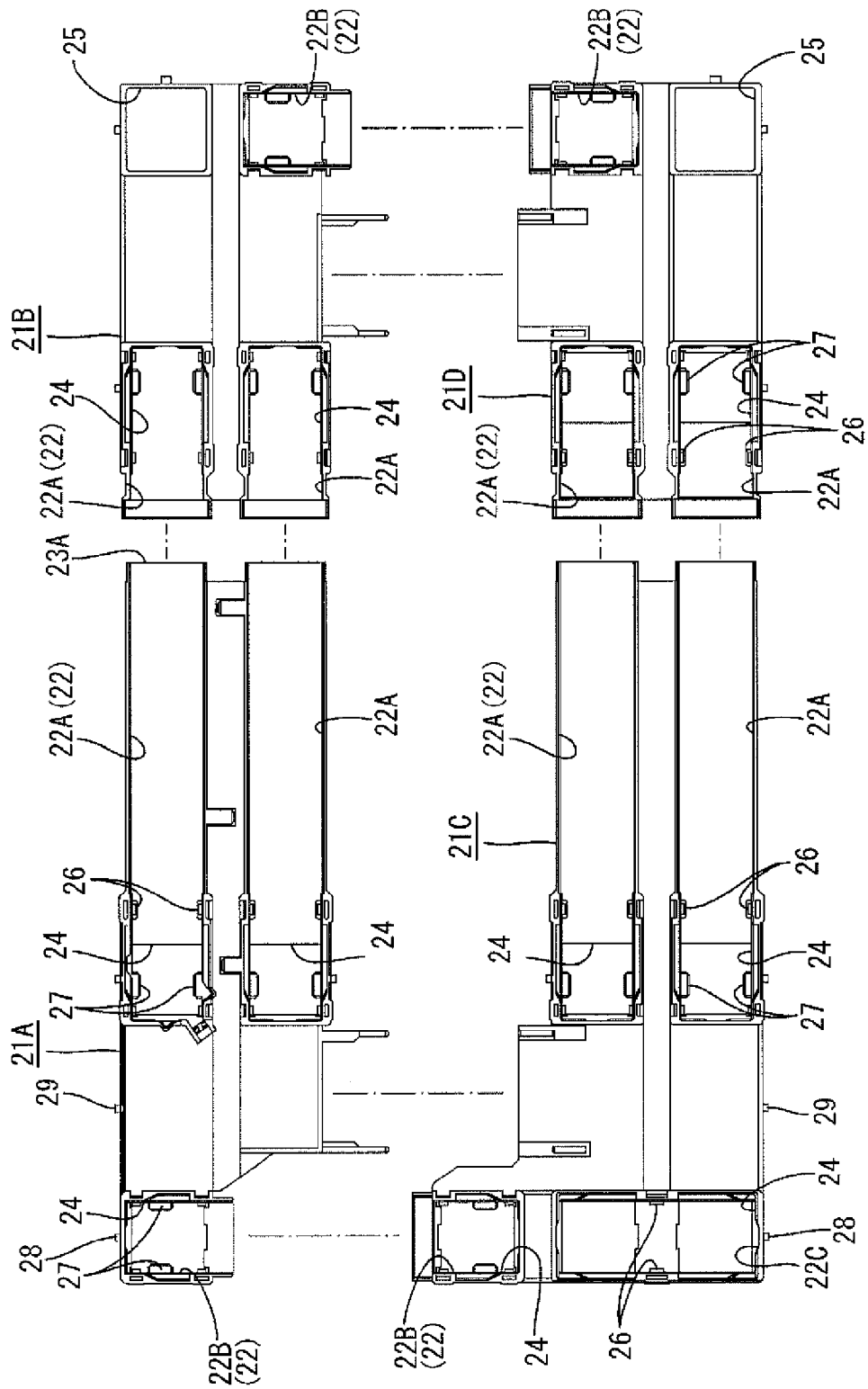
FIG. 7 is a plan view of a resin protector.

The resin protector 20 is formed by processing an insulating composite resin material into a predetermined shape. FIG. 7 is a plan view of coupling units 21A, 21B, 21C, and 21D forming the resin protector 20. The resin protector 20 of this embodiment is formed by combining the four coupling units 21A, 21B, 21C, and 21D shown in FIG. 7.

The coupling unit 21A is combined with the coupling unit 21B. The coupling units 21A and 21B form two bus bar accommodating portions 22 (22A) that hold and accommodate the first bus bars 11A. The bus bar accommodating portions 22A are each in the shape of a small container that extends along the left-right direction in FIG. 7, inside of which the first bus bar 11A is held. Furthermore, the bus bar accommodating portion 22A can be extended and retracted along the longitudinal direction of the first bus bar 11A.

The bus bar accommodating portion 22A includes a bottom plate portion 23A on which the first bus bar 11A is placed, and a peripheral wall portion 23B that surrounds the bottom plate portion 23A. Each of the bottom plate portion 23A and the peripheral wall portion 23B is divided between the coupling unit 21A side and the coupling unit 21B side. Both ends in the longitudinal direction of the bottom plate portion 23A are respectively provided with opening portions 24. At the opening portions 24, the ends of the first bus bar 11A are exposed from the bus bar accommodating portion 22A so as to allow contact with the electrode terminals 4.

The inner face of the peripheral wall portion 23B is provided with a plurality of restricting protrusions 26 that restrict upward movement of the first bus bar 11A in the thickness direction. The restricting protrusions 26 are shaped so as to project from the inner face of the peripheral wall portion 23B, and press the first bus bar 11A from its upper face side to the bottom plate portion 23A side. The inner face of the peripheral wall portion 23B is further provided with a plurality of engagement protrusions 27 that respectively engage with the cut-out portions 13 of the first bus bar 11A. As shown in FIG. 4, the engagement protrusions 27 are shaped so as to project from the inner face of the peripheral wall portion 23B, and extend along the longitudinal direction of the first bus bar 11A. Furthermore, the engagement protrusions 27 are each set to be smaller than the cut-out portion 13. A gap is provided in advance between both ends in the longitudinal direction of the engagement protrusion 27 and the cut-out portion 13.

The coupling unit 21A side of the bus bar accommodating portion 22A can move in the left-right direction along the longitudinal direction of the first bus bar 11A, within a range in which the engagement protrusions 27 can move inside the cut-out portions 13. In a similar manner, the coupling unit 21B side of the bus bar accommodating portion 22A also can move in the left-right direction along the longitudinal direction of the first bus bar 11A, within a range in which the engagement protrusions 27 can move inside the cut-out portions 13. In this manner, the bus bar accommodating portions 22A can be extended and retracted (in other words, can slide) along the longitudinal direction of the first bus bars 11A.

Furthermore, the coupling unit 21C is combined with the coupling unit 21D. The coupling units 21C and 21D form two bus bar accommodating portions 22A that accommodate the first bus bars 11A. The bus bar accommodating portions 22A configured by the coupling units 210 and 21D have a basic configuration similar to that of the above-described bus bar accommodating portions 22A configured by the two coupling units 21A and 21B. The bus bar accommodating portions 22A configured by the coupling units 210 and 21D also can be extended and retracted (in other words, can slide) along the longitudinal direction of the first bus bars 11A.

Furthermore, the above-described coupling unit 21A is combined also with the coupling unit 21C. The coupling units 21A and 21C form one bus bar accommodating portion 22 (22B) that holds and accommodates the second bus bar 11B. The bus bar accommodating portion 22B is in the shape of a small container that extends along the upper-lower direction in FIG. 7, inside of which the second bus bar 11B is held. Furthermore, the bus bar accommodating portion 22B can be extended and retracted along the longitudinal direction of the second bus bar 11B.

The bus bar accommodating portion 22B includes a bottom plate portion 23A on which the second bus bar 11B is placed, and a peripheral wall portion 23B that surrounds the bottom plate portion 23A. Each of the bottom plate portion 23A and the peripheral wall portion 23B is divided between the coupling unit 21A side and the coupling unit 21C side. Both ends in the longitudinal direction of the bottom plate portion 23A are respectively provided with opening portions 24. At the opening portions 24, the ends of the second bus bar 11B are exposed from the bus bar accommodating portion 22 so as to allow contact with the electrode terminals 4.

The inner face of the peripheral wall portion 23B is provided with a plurality of restricting protrusions 26 that restrict upward movement of the second bus bar 11B in the thickness direction. The restricting protrusions 26 are shaped so as to project from the inner face of the peripheral wall portion 23B, and press the second bus bar 11B from its upper face side to the bottom plate portion 23A side. The inner face of the peripheral wall portion 23B is further provided with a plurality of engagement protrusions 27 that respectively engage with the cut-out portions 13 of the second bus bar 11B. As shown in FIG. 4, the engagement protrusions 27 are shaped so as to project from the inner face of the peripheral wall portion 23B, and extend along the longitudinal direction of the second bus bar 11B. Furthermore, the engagement protrusions 27 are each set to be smaller than the cut-out portion 13, and a gap is provided in advance between both ends in the longitudinal direction of the engagement protrusion 27 and the cut-out portion 13.

The coupling unit 21A side of the bus bar accommodating portion 22B can move in the upper-lower direction in FIG. 7 along the longitudinal direction of the second bus bar 11B, within a range in which the engagement protrusions 27 can move inside the cut-out portions 13. In a similar manner, the coupling unit 21C side of the bus bar accommodating portion 22B also can move in the upper-lower direction in FIG. 7 along the longitudinal direction of the second bus bar 11B, within a range in which the engagement protrusions 27 can move inside the cut-out portions 13. In this manner, the bus bar accommodating portion 22B can be extended and retracted (in other words, can slide) along the longitudinal direction of the second bus bar 11B.

Furthermore, the coupling unit 21B is combined also with the coupling unit 21D. The coupling units 21B and 21D form one bus bar accommodating portion 22B that accommodates the second bus bar 11B. The bus bar accommodating portion 22B configured by the coupling units 21B and 21D has a basic configuration similar to that of the above-described bus bar accommodating portion 22B configured by the coupling units 21A and 21C. The bus bar accommodating portion 22B configured by the units 21B and 21D can be extended and retracted (in other words, can slide) along the longitudinal direction of the second bus bar 11B.

Note that the coupling unit 21C is provided with a bus bar accommodating portion 22 (22C) that holds and accommodates the second bus bar 11B. The bus bar accommodating portion 22C is not extended or retracted along the longitudinal direction of the second bus bar 11B, but includes a bottom plate portion 23A and a peripheral wall portion 23B that surrounds the bottom plate portion 23A as in the case of the bus bar accommodating portion 22B. Furthermore, the bus bar accommodating portion 22C includes opening portions 24, restricting protrusions 26, and the like, as in the case of the bus bar accommodating portion 22B.

Furthermore, the coupling unit 21B and the coupling unit 21D are respectively provided with opening portions 25. The electrode terminals 4 that are positioned at the ends of the cells 3 connected in series are respectively exposed from the opening portions 25 when the battery wiring module 10 is placed on the cell group 2.

The electrode terminal 4 of the cell 3 that is at the rearmost of the second cell row 2B (the uppermost side in FIG. 3) is exposed from the opening portion 25 of the coupling unit 21B (see FIG. 3). Meanwhile, the electrode terminal 4 of the cell 3 that is at the frontmost of the second cell row 2B (the lowermost side in FIG. 3) is exposed from the opening portion 25 of the coupling unit 21D (see FIG. 3). Note that the electrode terminals 4 exposed from the opening portions 25 are respectively connected to external connection terminals (not shown). Furthermore, these external connection terminals are connected to electrical wire terminals that are further linked to external inverters or the like.

This resin protector 20 can be deformed so as to be extended or retracted (extending and retracting deformation) to some extent in each of the left-right direction (the longitudinal direction of the first bus bars 11A) and the front-rear direction (the longitudinal direction of the second bus bars 11B) in accordance with, e.g., a dislocation of the ends of the bus bars 11 and the electrode terminals 4, which may be caused by attachment errors of the electrode terminals 4 or the like.

Furthermore, the resin protector 20 fouled by coupling the four coupling units 21A, 21B, 21C, and 21D can be regarded as on the whole including one peripheral wall 20A in the shape of a square tube (see FIG. 3). The peripheral wall 20A is substantially rectangular when viewed from above, and is configured by the peripheral wall portions 23B of the bus bar accommodating portions 22A, 22B, and 22C that are arranged on the outer side in the coupling units 21A, 21B, 21C, and 21D, and other wall-like portions of the coupling units 21A, 21B, 21C, and 21D. Note that the height of the peripheral wall 20A is set as appropriate, for example, such that tools are not accidentally brought into contact with the bus bars 11 at the time of attachment of the battery wiring module 10 to the cell group 2. In this embodiment, the height of the peripheral wall 20A is set to be constant throughout the entire periphery. In the peripheral wall 20A, the peripheral walls in the direction in which the cell rows 2A and 2B are arranged side by side (the left-right direction in FIG. 3) are denoted by 201A, and the peripheral walls in the upper-lower direction in FIG. 3 are denoted by 202A.

The resin protector 20 accommodates, in addition to the bus bars 11, a plurality of voltage detection terminals (not shown) for detecting the voltage of the cells 3. The voltage detection terminals are placed on the bus bars 11, and voltage detection electrical wires (not shown) are respectively connected to the voltage detection terminals by pressure bonding or the like. Note that these voltage detection electrical wires are connected to a battery ECU (not shown). The battery ECU has a microcomputer, an element, or the like mounted therein, and has a well-known configuration including the functions for detecting voltages, currents, temperatures, and the like of the cells 3, or for controlling charge and discharge of the cells 3, for example.

As shown in FIG. 3, the two peripheral walls 201A arranged in the direction in which the two cell rows 2A and 2B are arranged side by side (the left-right direction in FIG. 3) in the peripheral wall 20A of the resin protector 20 are each provided with a plurality of engagement portions 28 and positioning protrusions 29. As shown in FIG. 2, the positioning protrusion 29 is provided between two engagement portions 28 provided on the peripheral wall 201A that is disposed at the position corresponding to the first cell row 2A.

The engagement portions 28 are configured so as to engage with engageable portions 32 provided on the cover 30. The positioning protrusions 29 are configured so as to be fitted to positioning recess portions 33 (exemplary positioning portions) provided on the cover 30. When the positioning protrusions 29 are fitted to the positioning recess portions 33, the cover 30 is positioned with respect to the resin protector 20 at the time of attachment of the cover 30 to the resin protector 20.

The engagement portions 28 and the positioning protrusions 29 project outward from the peripheral walls 201A. The upper faces of the engagement portions 28 are formed as inclined faces 28A that are inclined from the upper side to the lower side, and the inclined faces 28A guide the engageable portions 32. The faces of the engagement portions 28 below the inclined faces 28A are engagement faces 28B that are brought into contact with the engageable portions 32, thereby causing the engageable portions 32 to be engaged with the engagement portions 28 (see FIG. 12).

As shown in FIG. 1, the cover 30 is substantially rectangular when viewed from above. In order to prevent tools and the like from being brought into contact with the bus bars 11 and causing a short-circuit of the battery module 1, for example, the cover 30 is detachably attached to the resin protector 20 so as to cover the opening of the resin protector 20 (portion surrounded by the upper end of the peripheral wall 20A). The cover 30 as well as the resin protector 20 is made of an insulating composite resin material.

The cover 30 includes a cover main body portion 31 in the shape of a plate, and a plurality of engageable portions 32 and positioning recess portions 33 that are provided on the edges along the long sides of the cover main body portion 31. The engageable portions 32 of the cover 30 are configured so as to be engaged with the engagement portions 28 of the resin protector 20, and the positioning recess portions 33 are configured so as to be positioned by allowing the positioning protrusions 29 of the resin protector 20 to be fitted thereto.

The engageable portions 32 of the cover 30 are in the shape of frames (or rings), and a plurality of (for example, four) such engageable portions 32 are provided corresponding to the engagement portions 28, on each of two side faces along the long sides. The engageable portions 32 each include two vertical frame portions 32A arranged in the upper-lower direction shown in FIG. 2 and a horizontal frame portion 32B connecting the two vertical frame portions 32A. The portion surrounded by the vertical frame portions 32A and the horizontal frame portion 32B of the engageable portion 32 is an opening portion 32C that opens such that the engagement portion 28 can be inserted thereto.

The size of the opening portion 32C of the engageable portion 32 is set such that gaps 32D having a certain size are formed between the engagement portion 28 and the vertical frame portions 32A. Furthermore, the engageable portion 32 can move in the long side direction of the resin protector 20 (the left-right direction in FIG. 1) relative to the engagement portion 28.

Figure 8:
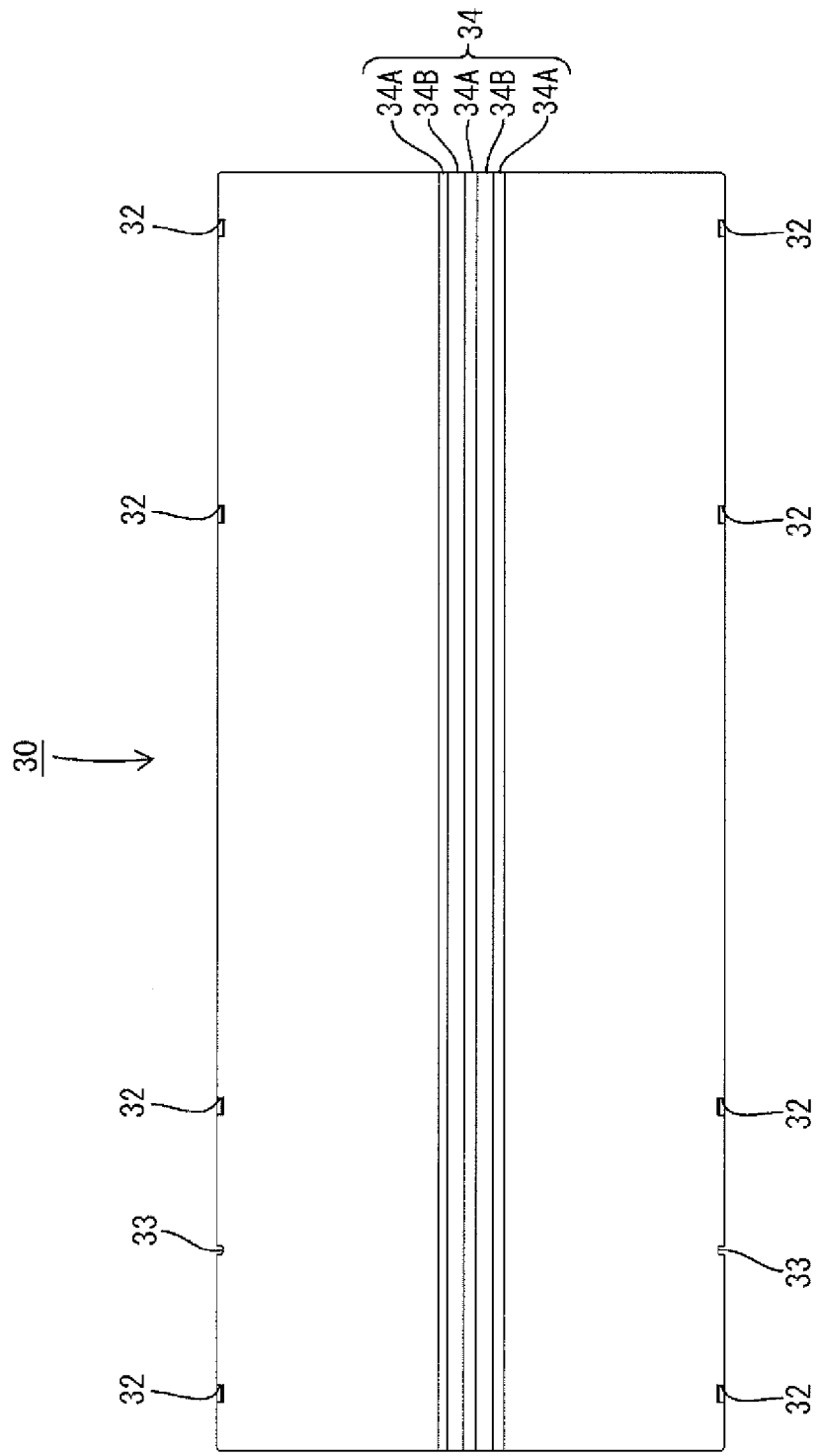
FIG. 8 is a plan view of a cover.
Figure 10:
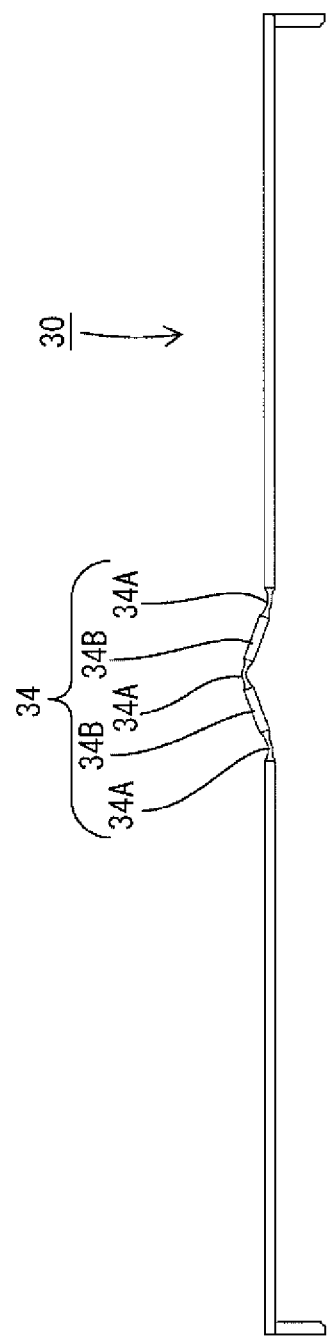
FIG. 10 is a side view of the cover in a natural state.
Figure 11:
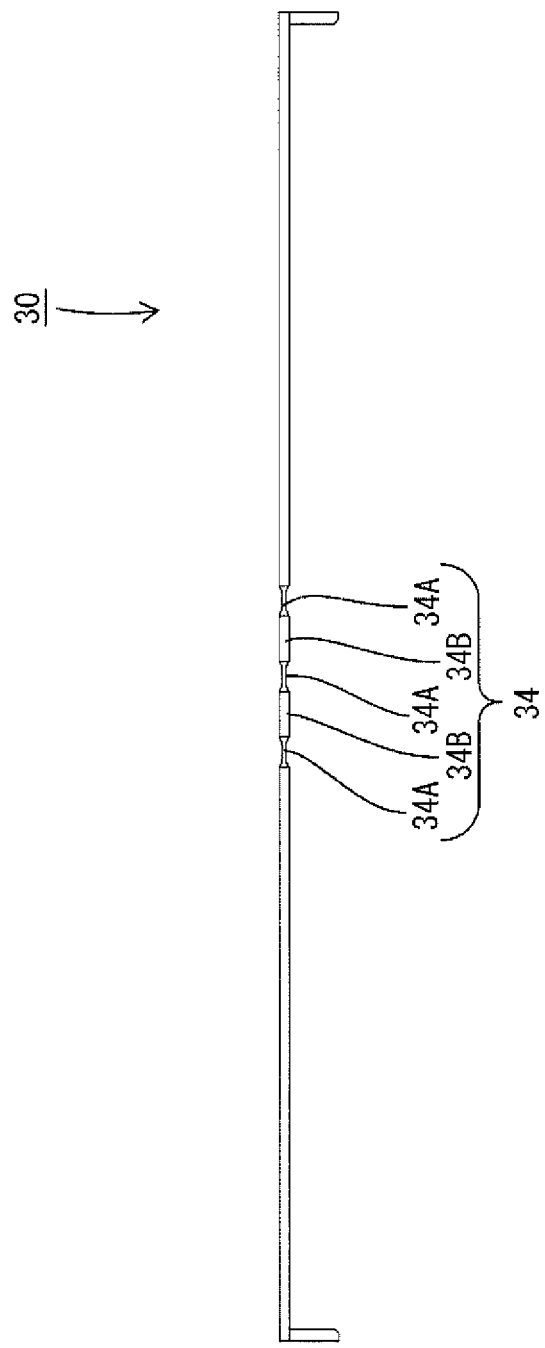
FIG. 11 is a side view of the cover in which a dislocation compensating portion has been extended.
Figure 12:
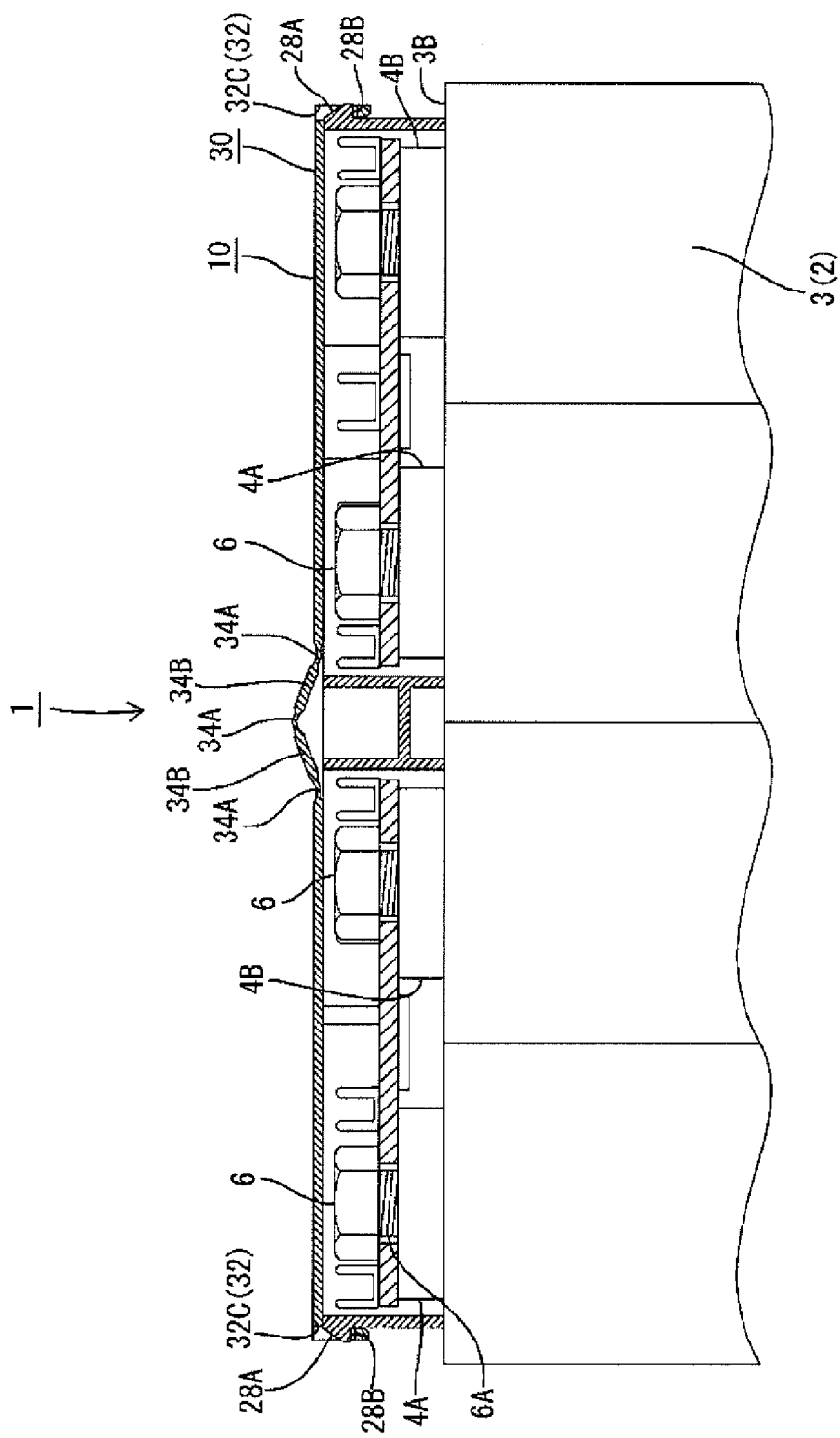
FIG. 12 is a partial cross-sectional view taken along the line A-A in FIG. 1.

As shown in FIGS. 10 to 12, in this embodiment, the substantially middle portion of the cover 30 includes a plurality of (in this embodiment, three) thin-walled portions 34A that each have a wall thickness smaller than that of other portions and (in this embodiment, two) thick-walled portions 34B that are each formed between two of the thin-walled portions 34A and that have a wall thickness larger than that of the thin-walled portion 34A. As shown in FIG. 8, the thin-walled portions 34A and the thick-walled portions 34B are formed in the shape of belts extending from one of the ends (left end in FIG. 8) to the other end (right end in FIG. 8) along the longitudinal direction of the cover 30.

In this embodiment, when the cover 30 is bent at the thin-walled portions 34A, the cover 30 can be extended and compressed in the short side direction (see FIG. 12). That is to say, in this embodiment, the cover 30 can move relative to the resin protector 20 in the left-right direction in FIG. 1, and the portion configured by the thin-walled portions 34A and the thick-walled portions 34B functions as a dislocation compensating portion 34.

Next, the process that attaches the battery wiring module 10 to the cell group 2 will be described. As shown in FIG. 1, two cell rows 2A formed by arranging four cells 3 in a row are arranged side by side in the left-right direction. The battery wiring module 10 shown in FIG. 4 is placed on faces on which the electrode terminals 4 of the two cell rows 2A and 2B are formed. At that time, the ends of the bus bars 11 of the battery wiring module 10 are respectively placed on the electrode terminals 4 of the cell rows 2A and 2B. Each bus bar 11 extends to link predetermined electrode terminals 4A and 4B.

Furthermore, the through hole 12 of the bus bar 11 and the screw hole 5 provided in the electrode terminal 4 are positioned one on the other (see FIG. 3). At the time of performing this positioning, the external shape of the battery wiring module 10 (the resin protector 20) changes in accordance with attachment errors of the electrode terminals 4 and the like. When the battery wiring module 10 is defaulted and the resin protector 20 is extended in the short side direction (the front-rear direction of the battery module 1), an interval between part of the adjacent engagement portions 28 becomes larger. On the other hand, when the battery wiring module 10 is deformed and the resin protector 20 is retracted in the short side direction (the front-rear direction of the battery module 1), an interval between part of the adjacent engagement portions 28 becomes smaller.

Next, the shank portion 6A of the fixing bolt 6 is inserted through the through hole 12 and the screw hole 5 positioned one on the other, and the fixing bolt 6 is screwed into the screw hole 5. Thus, the bus bar 11 is fixed in close contact with the electrode terminal 4. When all of the bus bars 11 are fixed to the electrode terminals 4 using the fixing bolts 6, the cells 3 forming the cell group 2 are connected in series, and the battery wiring module 10 is attached to the cell group 2.

Figure 9:
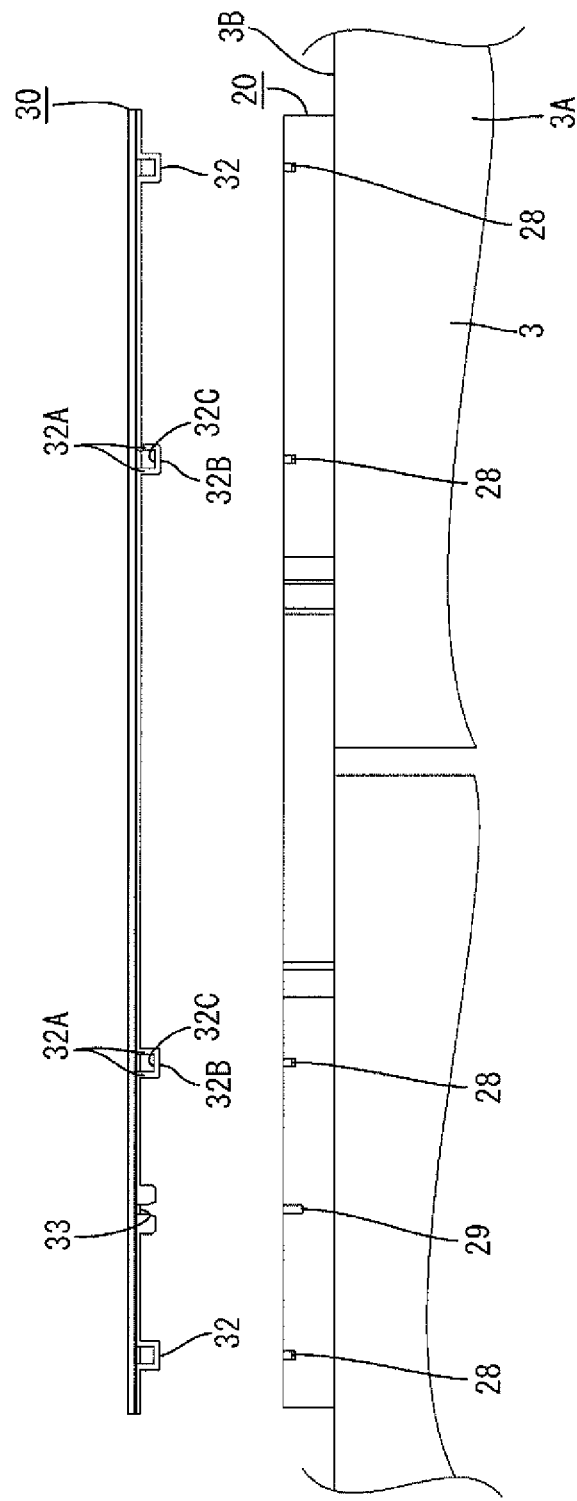
FIG. 9 is a front view of the battery module before the cover and the resin protector are engaged with each other.

Next, the process that attaches the cover 30 to the battery wiring module 10 will be described. First, as shown in FIG. 9, the cover 30 is arranged above the battery wiring module 10 so as to cover the battery wiring module 10 attached to the cell group 2. Then, the positioning recess portions 33 formed in the cover main body portion 31 are fitted to the positioning protrusions 29 formed on the peripheral wall 20A of the resin protector 20, so that the cover 30 is positioned with respect to the resin protector 20.

When the cover 30 is positioned with respect to the resin protector 20, the position of each engageable portion 32 formed on the cover main body portion 31 is set to the position of each engagement portion 28 formed on the resin protector 20. The horizontal frame portion 32B of the engageable portion 32 moves downward along the inclined face 28A of the engagement portion 28. When moving downward along the guide portion 51a, the engageable portion 32 opens outward. Then, after the horizontal frame portion 32B of the engageable portion 32 passes by the inclined face 28A and the engagement face 28B of the engagement portion 28, the engageable portion 32 elastically returns to its original shape, and the engagement portion 28 is placed inside the opening portion 32C of the engageable portion 32. When the engagement portion 28 is placed inside the opening portion 32C, the engagement face 28B of the engagement portion 28 engages with the horizontal frame portion 32B of the engageable portion 32. That is to say, the frame-like engageable portion 32 is caught by the protrusion-like engagement portion 28.

Note that, when the engagement portion 28 and the engageable portion 32 are engaged with each other, the engagement face 28B of the engagement portion 28 protrudes outward from the opening portion 32C of the engageable portion 32, and prevents the cover 30 from moving upward and coming off. In this manner, the engagement portions 28 and the engageable portions 32 are respectively engaged with each other, and, thus, the cover 30 is attached to the battery wiring module 10.

At that time, in this embodiment, the opening portion 32C of the engageable portion 32 is set to be larger than the engagement portion 28, and the gaps 32D are formed between the engagement portion 28 and the engageable portion 32 as shown in FIG. 2. Thus, the engageable portion 32 that has been engaged with the engagement portion 28 can move to some extent in the long side direction of the resin protector 20. That is to say, in this embodiment, for example, even when an interval between the adjacent engagement portions 28 changes because the shape of the resin protector 20 changes in the long side direction by absorbing a variation of the pitch between the electrode terminals 4, the engageable portions 32 can be engaged while moving relative to the engagement portions 28 along the long side direction of the resin protector 20.

Furthermore, in this embodiment, even when the resin protector 20 is deformed so as to be extended or retracted in the short side direction due to a production tolerance, an assembly tolerance, or the like of the cells 3, the dislocation compensating portion 34 configured by the thin-walled portions 34A and the thick-walled portions 34B provided on the cover 30 are extended or compressed, and the cover 30 can relatively move in the short side direction of the resin protector 20, so that the cover 30 can be reliably attached to the resin protector 20 (see FIGS. 10 and 11).

Next, the effects of this embodiment will be described.

In this embodiment, the dislocation compensating portion 34 that compensates a dislocation of the resin protector 20 that is deformed or moved in accordance with a variation of the pitch between the electrode terminals 4 is formed on the cover 30 for the battery wiring module 10. Thus, even when the resin protector 20 is dislocated by being deformed or moved, due to a variation of the pitch between the electrode terminals 4, for example, resulting from a production tolerance or an assembly tolerance of the cells 3 forming the cell group 2 or swelling of the cells 3 forming the cell group 2, the dislocation of the resin protector 20 in the short side direction can be compensated by the cover.

As a result, according to this embodiment, even when the battery wiring module 10 (the resin protector 20) is dislocated by absorbing a variation of the pitch between the electrode terminals 4, the dislocation is compensated by the dislocation compensating portion 34 formed on the cover 30. Thus, the cover 30 can be reliably attached to the battery wiring module 10.

In particular, according to this embodiment, the dislocation compensating portion 34 is configured by a plurality of thin-walled portions 34A, and thick-walled portions 34B that are each formed between two of the thin-walled portions 34A and that have a wall thickness larger than that of the thin-walled portion 34A. Thus, when the thin-walled portions 34A having a smaller wall thickness are bent, the cover can be extended and compressed, so that the dislocation can be compensated with a simple structure (see FIGS. 10 and 11).

Furthermore, according to this embodiment, the resin protector 20 is provided with the engagement portions 28, and the cover 30 is provided with the engageable portions 32 that, while being engaged with the engagement portions 28, can move in the long side direction of the resin protector 20. Thus, when the engageable portions 32 provided on the cover 30, which have been engaged with the engagement portions 28 provided on the resin protector 20, move in the long side direction of the resin protector 20, the dislocation compensating portion 34 can compensate dislocations in a direction that intersects the short side direction of the resin protector 20. Furthermore, according to this embodiment, the cover 30 is engaged with the resin protector 20, and, thus, the cover 30 can be reliably prevented from being coming off.

Moreover, according to this embodiment, the cover 30 is provided with the positioning recess portions 33 that are positioned with respect to the resin protector 20. Thus, the operation efficiency when attaching the cover 30 to the resin protector 20 is improved.

Other Embodiments

The present invention is not limited to the embodiment described above with reference to the drawings, and the technical scope thereof also encompasses, for example, embodiments as below.

(1) In the foregoing embodiment, the dislocation compensating portion 34 is provided by alternately arranging the thin-walled portions 34A and the thick-walled portions 34B along the long side direction of the resin protector 20, but the dislocation compensating portion 34 may be provided along the short side direction of the resin protector 20. Furthermore, the numbers of thin-walled portions 34A and thick-walled portions 34B are not limited to those shown in FIG. 1 and the like.

(2) In the foregoing embodiment, four engagement portions 28 are provided on each of the peripheral walls 201A in the direction in which the cell rows 2A and 2B are arranged side by side in the resin protector 20, but the engagement portions 28 may be formed on the peripheral walls 202A provided on the short side direction of the resin protector 20. Furthermore, the number of engagement portions 28 may differ between the two peripheral walls 201A.

(3) In the foregoing embodiment, the cover 30 is provided with the positioning recess portions 33 as positioning portions, but the cover 30 may be provided with protrusion-like positioning portions, and the resin protector 20 may be provided with the positioning recess portions 33 that can be fitted to or engaged with the protrusion-like positioning portions of the cover 30.

(4) In the foregoing embodiment, the battery wiring module 10 is shown that includes one cover 30, but the battery wiring module may include two or more covers 30.

Note that the configuration as in Embodiment 1 in which one cover 30 is provided is preferable because the attachment operation is simple.

(5) In the foregoing embodiment, one cell row is formed by arranging four cells 3 in a row, but the number of cells 3 forming the cell row may be three or less, or may be five or more.

(6) In the foregoing embodiment, the cell group 2 is shown that is formed by arranging two cell rows 2A and 2B side by side, but the number of cell rows may be one, or may be three or more.

(7) In the foregoing embodiment, the resin protector is shown that is formed by coupling a plurality of coupling units, but this is not a limitation. The resin protector may be configured by a plurality of units that are not coupled. If the resin protector configured by a plurality of units is used, a cover may be provided for each unit, or one cover may be shared by the plurality of units.

The invention claimed is:

1. A cover for a battery wiring module,
the battery wiring module including:
a bus bar that electrically connects positive and negative electrode terminals of a cell group formed by arranging in a row a plurality of cells having the electrode terminals; and
a resin protector that holds the bus bar, the cover being configured to cover the resin protector, the resin protector being configured to deform or move in accordance with a variation of a pitch between the electrode terminals,
the cover of the battery wiring module comprising:
a dislocation compensating portion that is configured to deform to compensate a dislocation of the resin protector resulting from deformation or movement of the resin protector, the dislocation compensating portion including:
a plurality of thin-walled portions that have a wall thickness smaller than a wall thickness of other portions of the cover, and
a thick-walled portion that is formed between two of the plurality of thin-walled portions, the thick-walled portion having a wall thickness greater than the wall thickness of the plurality of thin-walled portions.

2. The cover for a battery wiring module according to claim 1, wherein:
the resin protector includes an engagement portion; and
the cover includes an engageable portion that, while being engaged with the engagement portion, moves in a direction that intersects a direction in which the plurality of thin-walled portions and the thick-walled portion are arranged side by side.

3. The cover for a battery wiring module according to claim 1, further comprising a positioning portion that is positioned with respect to the resin protector.

4. A battery wiring module comprising:
a bus bar that electrically connects positive and negative electrode terminals of a cell group formed by arranging in a row a plurality of cells having the electrode terminals;
a resin protector that holds the bus bar, the resin protector being configured to deform or move in accordance with a variation of a pitch between the electrode terminals; and
a cover that is configured to cover the resin protector, the cover including a dislocation compensating portion that is configured to deform to compensate a dislocation of the resin protector resulting from deformation or movement of the resin protector, the dislocation compensating portion including:
a plurality of thin-walled portions that have a wall thickness smaller than a wall thickness of other portions of the cover; and
a thick-walled portion that is formed between two of the plurality of thin-walled portions, the thick-walled portion having a wall thickness greater than the wall thickness of the plurality of thin-walled portions.

5. The battery wiring module according to claim 4, wherein:
the resin protector includes an engagement portion; and
the cover includes an engageable portion that, while being engaged with the engagement portion, moves in a direction that intersects a direction in which the plurality of thin-walled portions and the thick-walled portion are arranged side by side.

6. The battery wiring module according to claim 4, wherein the cover includes a positioning portion that is positioned with respect to the resin protector.

7. The cover for a battery wiring module according to claim 2, further comprising a positioning portion that is positioned with respect to the resin protector.

8. The battery wiring module according to claim 5, wherein the cover includes a positioning portion that is positioned with respect to the resin protector.

9. The battery wiring module according to claim 1, wherein the plurality of thin-walled portions are configured to bend when the dislocation compensating portion deforms to compensate the dislocation of the resin protector.

10. The battery wiring module according to claim 4, wherein the plurality of thin-walled portions are configured to bend when the dislocation compensating portion deforms to compensate the dislocation of the resin protector.

* * * * *